US012687652B2

(12) United States Patent
Sun

(10) Patent No.: US 12,687,652 B2
(45) Date of Patent: Jul. 21, 2026

(54) METHOD AND SYSTEM FOR DETERMINING AZIMUTH OF MARSQUAKE/MOONQUAKE EVENT

(71) Applicant: INSTITUTE OF GEOLOGY AND GEOPHYSICS, CAS, Beijing (CN)

(72) Inventor: Weijia Sun, Beijing (CN)

(73) Assignee: INSTITUTE OF GEOLOGY AND GEOPHYSICS, CAS, Beijing (CN)

( * ) Notice: Subject to any disclaimer, the term of this patent is extended or adjusted under 35 U.S.C. 154(b) by 386 days.

(21) Appl. No.: 18/510,065

(22) Filed: Nov. 15, 2023

(65) Prior Publication Data

US 2025/0060496 A1    Feb. 20, 2025

(30) Foreign Application Priority Data

Aug. 16, 2023    (CN) .......................... 202311034162.2

(51) Int. Cl.
*G01V 1/30* (2006.01)
*G01V 1/32* (2006.01)
*G01V 1/36* (2006.01)

(52) U.S. Cl.
CPC .............. *G01V 1/307* (2013.01); *G01V 1/325* (2013.01); *G01V 1/364* (2013.01); *G01V 2210/42* (2013.01)

(58) Field of Classification Search
CPC . G01V 1/307; G01V 1/30; G01V 1/28; G01V 1/00; G01V 1/325; G01V 1/32; G01V 1/364; G01V 1/36; G01V 2210/42; G01V 2210/40; G01V 2210/00; G06F 17/16; G06F 17/18; G06F 18/20; B64G 1/00; G01C 21/00
See application file for complete search history.

(56) References Cited

U.S. PATENT DOCUMENTS

| 2013/0328688 A1* | 12/2013 | Price ...................... G08B 21/10 367/129 |
| 2017/0183959 A1* | 6/2017 | Ellmauthaler ......... G01V 1/226 |
| 2020/0124757 A1* | 4/2020 | Zheng ...................... G01V 1/50 |

* cited by examiner

*Primary Examiner* — Mohamed Charioui
(74) *Attorney, Agent, or Firm* — BROOKS KUSHMAN P.C.

(57) ABSTRACT

A method and system for determining an azimuth of a marsquake/moonquake event. The method includes: filtering the original waveform data to obtain filtered waveform data; intercepting filtered waveform data of a set time length to obtain first arrival waveform data of a P wave; performing data analysis on the first arrival waveform data of the P wave, determining the first arrival waveform data of the P wave of an east component as X-column data and the first arrival waveform data of the P wave of a north component as Y-column data; and performing optimal fitting on the X-column data and the Y-column data to obtain a first arrival elliptical locus of the P wave obtained after the optimal fitting, and determining an azimuth of a marsquake/moonquake relative to the single seismic station according to the first arrival elliptical locus of the P wave obtained after the optimal fitting.

6 Claims, 4 Drawing Sheets

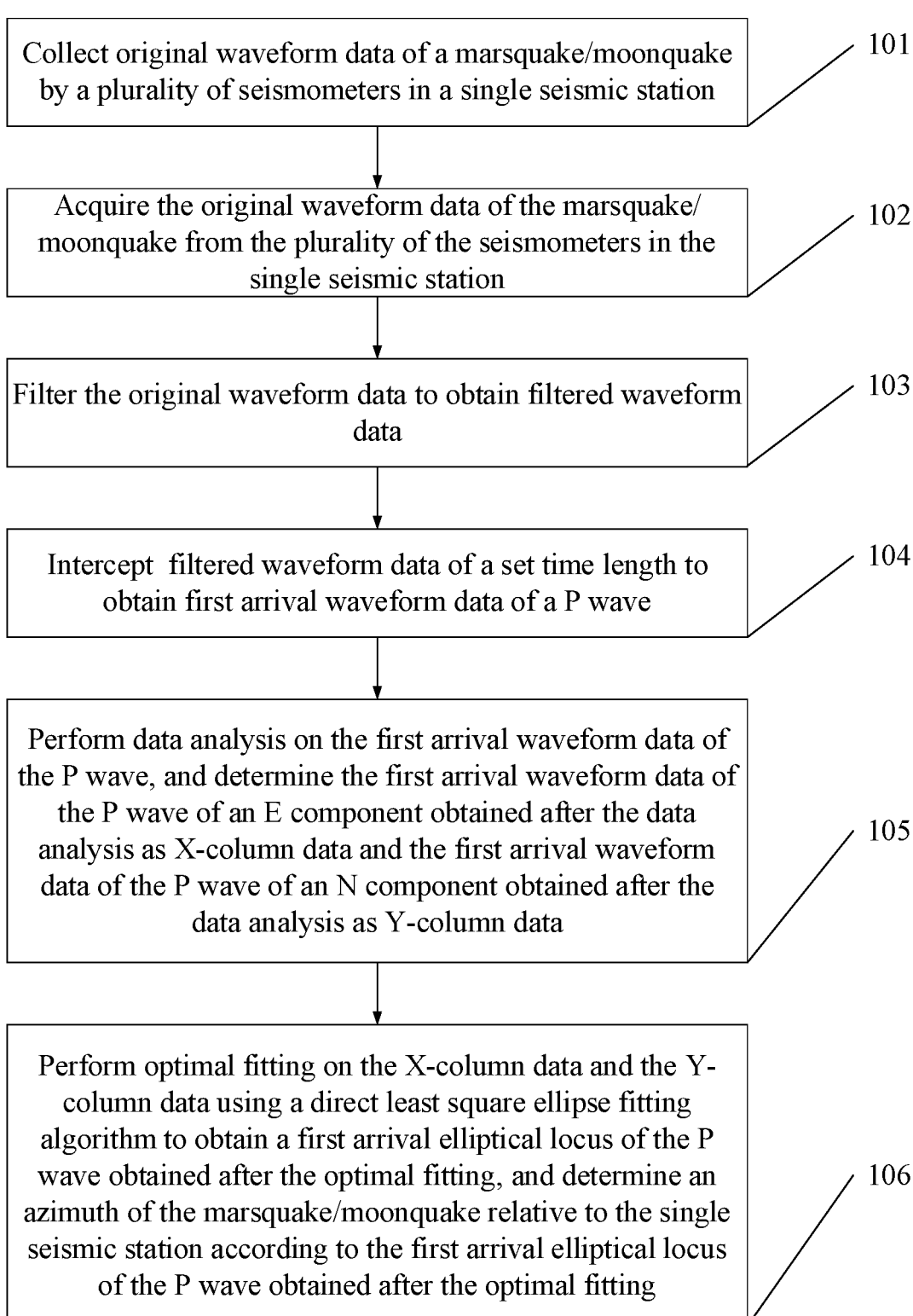

Collect original waveform data of a marsquake/moonquake by a plurality of seismometers in a single seismic station — 101

Acquire the original waveform data of the marsquake/ moonquake from the plurality of the seismometers in the single seismic station — 102

Filter the original waveform data to obtain filtered waveform data — 103

Intercept filtered waveform data of a set time length to obtain first arrival waveform data of a P wave — 104

Perform data analysis on the first arrival waveform data of the P wave, and determine the first arrival waveform data of the P wave of an E component obtained after the data analysis as X-column data and the first arrival waveform data of the P wave of an N component obtained after the data analysis as Y-column data — 105

Perform optimal fitting on the X-column data and the Y-column data using a direct least square ellipse fitting algorithm to obtain a first arrival elliptical locus of the P wave obtained after the optimal fitting, and determine an azimuth of the marsquake/moonquake relative to the single seismic station according to the first arrival elliptical locus of the P wave obtained after the optimal fitting — 106

FIG. 1

METHOD AND SYSTEM FOR DETERMINING AZIMUTH OF MARSQUAKE/MOONQUAKE EVENT

CROSS REFERENCE TO RELATED APPLICATION

This application claims foreign priority benefits under 35 U.S.C. § 119(a)-(d) to Chinese Patent Application No. 2023110341622, filed on Aug. 16, 2023, which is hereby incorporated by reference herein in its entirety.

TECHNICAL FIELD

The present disclosure relates to the technical field of quake locating, and in particular, to a method and system for determining an azimuth of a marsquake/moonquake event based on a single seismic station.

BACKGROUND

In recent years, a seismometer is deployed on Mars to monitor and locate a marsquake (i.e., a quake occurring on Mars), and a seismometer will be deployed on the moon to monitor and locate a moonquake (i.e., a quake occurring on the moon). On the earth, a plurality of seismic stations are usually utilized to locate an earthquake, and related techniques are not suitable for locating a marsquake and a moonquake using a single seismic station.

The first step of marsquake/moonquake locating based on a single seismic station is to calculate an azimuth of a marsquake/moonquake relative to a seismometer. At present, an azimuth of a marsquake/moonquake based on a single seismic station is obtained by performing principal component analysis on a waveform of a horizontal component of a P wave. That is, a covariance matrix for the waveform of the horizontal component of the P wave is established. It is believed that an orientation of a feature vector corresponding to a maximum feature value of the covariance matrix is the azimuth of the marsquake/moonquake relative to the seismometer. This technique is only suitable for waveform data with a high signal to noise ratio. However, the signal to noise ratio of original waveform data of the marsquake/moonquake is usually low. The existing principal component analysis technique has a large error in the estimation of the azimuth of the marsquake/moonquake relative to the seismometer.

SUMMARY

The present disclosure provides a method and system for determining an azimuth of a marsquake/moonquake event based on a single seismic station to achieve the purpose of improving the accuracy of an azimuth of a marsquake/moonquake relative to a seismometer.

To achieve the above method and system, the present disclosure provides the following technical solutions.

In a first embodiment, the present disclosure provides a method for determining an azimuth of a marsquake/moonquake event, including:

collecting original waveform data of a marsquake/moonquake by a plurality of seismometers in a single seismic station; where when the single seismic station is situated on Mars, the original waveform data collected by the plurality of the seismometers in the single seismic station is original waveform data of a marsquake; and when the single seismic station is situated on Moon, the original waveform data collected by the plurality of the seismometers in the single seismic station is original waveform data of a moonquake; and acquiring, by a computer, the original waveform data of the marsquake/moonquake from the plurality of the seismometers in the single seismic station;

filtering, by the computer, the original waveform data to obtain filtered waveform data;

intercepting, by the computer, filtered waveform data of a set time length to obtain first arrival waveform data of a P wave, where a starting time of the set time length is an arrival time of the P wave;

performing, by the computer, data analysis on the first arrival waveform data of the P wave, and determining the first arrival waveform data of the P wave of an east (E) component obtained after the data analysis as X-column data and the first arrival waveform data of the P wave of a north (N) component obtained after the data analysis as Y-column data; and performing, by the computer, optimal fitting on the X-column data and the Y-column data using a direct least square ellipse fitting algorithm to obtain a first arrival elliptical locus of the P wave obtained after the optimal fitting, and determining an azimuth of the marsquake/moonquake relative to the single seismic station according to the first arrival elliptical locus of the P wave obtained after the optimal fitting.

In a second embodiment, the present disclosure provides a system for determining an azimuth of a marsquake/moonquake event, including: a plurality of seismometers in a single seismic station and a computer, where the plurality of the seismometers are configured to collect original waveform data of a marsquake/moonquake; when the single seismic station is situated on Mars, the original waveform data collected by the plurality of the seismometers in the single seismic station is original waveform data of a marsquake; and when the single seismic station is situated on Moon, the original waveform data collected by the plurality of the seismometers in the single seismic station is original waveform data of a moonquake;

the computer is configured to acquire the original waveform data of the marsquake/moonquake from the plurality of the seismometers for executing operations including:

filtering the original waveform data to obtain filtered waveform data;

intercepting filtered waveform data of a set time length to obtain first arrival waveform data of a P wave, where a starting time of the set time length is an arrival time of the P wave;

performing data analysis on the first arrival waveform data of the P wave, and determining the first arrival waveform data of the P wave of an E component obtained after the data analysis as X-column data and the first arrival waveform data of the P wave of an N component obtained after the data analysis as Y-column data; and performing optimal fitting on the X-column data and the Y-column data using a direct least square ellipse fitting algorithm to obtain a first arrival elliptical locus of the P wave obtained after the optimal fitting, and determining an azimuth of the marsquake/moonquake relative to the single seismic station according to the first arrival elliptical locus of the P wave obtained after the optimal fitting.

According to specific embodiments provided in the present disclosure, the present disclosure has the following technical effects:

Based on the physical feature that the particle motion locus of first arrival of a P wave is an ellipse, the present disclosure uses the direct least square ellipse fitting algorithm to fit the particle motion locus of first arrival of the P wave. An azimuth of a marsquake/moonquake relative to a single seismic station can be uniquely calculated depending comprehensively on the major axis angle of the fitted ellipse and the polarity of the maximum amplitude of the horizontal component of the P wave. The present disclosure uses a direct least square P wave first arrival elliptical locus fitting method, i.e., an optimization algorithm, which has strong anti-noise interference capability and is extremely suitable for calculating an azimuth of a marsquake/moonquake event relative to a single seismic station. Based on the azimuth of the marsquake/moonquake relative to the single seismic station, Mars/Moon locations, which are less likely to experience quake events, can be more accurately identified for landing future probes or spacecraft, thereby reducing a risk of the probes or spacecraft loss of connection with Earth caused by the marsquake/moonquake event.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other drawings can be derived from these accompanying drawings by those of ordinary skill in the art without creative efforts.

FIG. 1 is a flowchart of a method for determining an azimuth of a marsquake/moonquake event provided in an embodiment of the present disclosure;

DETAILED DESCRIPTION

Figure 2:
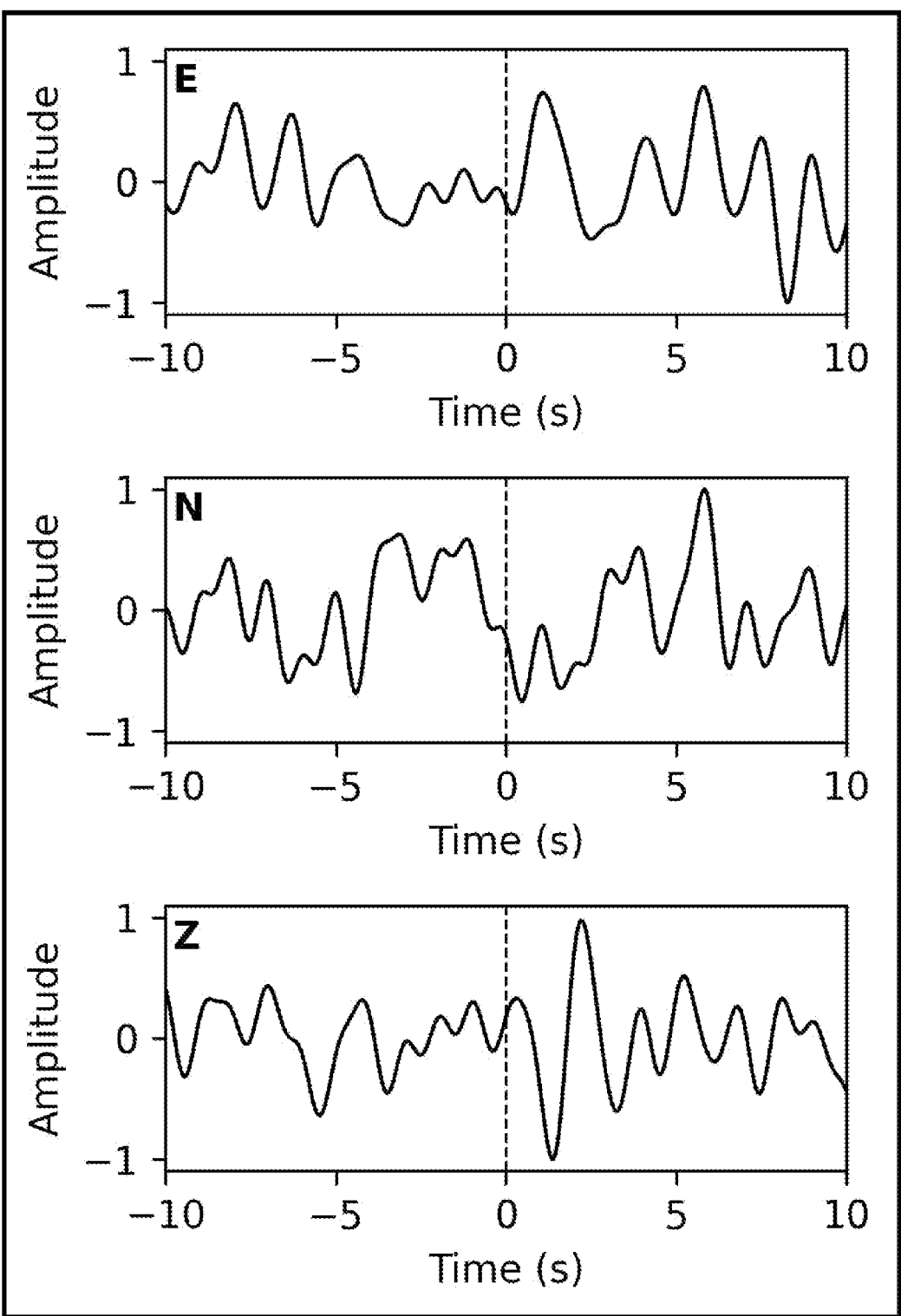
FIG. 2 is an original oscillogram of a marsquake provided in an embodiment of the present disclosure.

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments derived from the embodiments in the present disclosure by a person of ordinary skill in the art without creative efforts shall fall within the protection scope of the present disclosure.

The above features and advantages of the present disclosure clearer will be further described in detail below in combination with accompanying drawings and particular implementation modes.

Example 1

As shown in FIG. 1, this example provides a method for determining an azimuth of a marsquake/moonquake event, including the following steps.

Step 101: original waveform data of a marsquake/moonquake is collected by a plurality of seismometers in a single seismic station, where when the single seismic station is situated on Mars, the original waveform data collected by the single seismic station is original waveform data of a marsquake; and when the single seismic station is situated on the moon, the original waveform data collected by the single seismic station is original waveform data of a moonquake.

Step 102: a computer acquires the original waveform data of the marsquake/moonquake from the plurality of the seismometers in the single seismic station in order to process the original waveform data.

Step 103: the original waveform data is filtered by the computer to obtain filtered waveform data.

Step 104: filtered waveform data of a set time length is intercepted by the computer to obtain first arrival waveform data of a P wave, where a starting time of the set time length is an arrival time of the P wave. Preferably, the set time length is 10 seconds.

Step 105: data analysis is performed on the first arrival waveform data of the P wave, and the first arrival waveform data of the P wave of an E component obtained after the data analysis is determined as X-column data and the first arrival waveform data of the P wave of an N component obtained after the data analysis is determined as Y-column data.

Step 106: optimal fitting is performed on the X-column data and the Y-column data using a direct least square ellipse fitting algorithm to obtain a first arrival elliptical locus of the P wave obtained after the optimal fitting, and an azimuth of the marsquake/moonquake relative to the single seismic station is determined according to the first arrival elliptical locus of the P wave obtained after the optimal fitting.

Based on the azimuth of the marsquake/moonquake relative to the single seismic station, Mars/Moon locations, which are less likely to experience quake events, can be identified for landing future probes or spacecraft.

In the present example, the process of the optimal fitting is as follows:

An elliptic equation expression is as follows:

$$F(x, y) = ax^2 + bxy + cy^2 + dx + ey + f;\qquad(1)$$

The elliptic equation expression meets $b^2-4ac<0$, where a, b, c, d, e, and f represent ellipse coefficients; (x, y) represents a coordinate point, which are particle motion coordinates of the P wave here. Letting $a=[a, b, c, d, e, f]^T$ and $x=[x^2, xy, y^2, x, y, 1]$, the elliptic equation expression may be written as $F_a(x)=x\cdot a=0$.

A function for direct least square ellipse fitting of a particle motion locus of the P wave is as follows:

$$\min_a \sum_{i=1}^N F(x_i, y_i)^2 = \min_a \sum_{i=1}^N (x_i \cdot a)^2;\qquad(2)$$

where $(x_i, y_i)$ represents a discrete point of the X-column data and the Y-column data; $x_i$ represents a discrete point of vector x; i=1, 2, . . . , N, N being a number of discrete points.

The optimization process is to obtain the ellipse coefficients for minimizing the function (2).

In a preferred embodiment, step 102 specifically includes:

(1) rotate the original waveform data to a ZNE (vertical, north, east) orthogonal coordinate system to obtain ZNE coordinate system data; and (2) filter the ZNE coordinate system data using a filter to obtain filtered waveform data.

The determination process of the filter is as follows:

Spectral analysis is performed on the ZNE coordinate system data to obtain an effective frequency band range, and a matching filter is designed according to the effective frequency band range.

Usually, an accurate frequency band range can be known after performing spectral analysis on the ZNE coordinate system data, and the effective frequency band range is determined according to prior information, for example, 0.1-1 Hz.

In a preferred embodiment, the determining an azimuth of the marsquake/moonquake relative to the single seismic station according to the first arrival elliptical locus of the P wave obtained after the optimal fitting specifically includes the following steps.

(1) Since a major axis angle of the first arrival elliptical locus of the P wave obtained after the optimal fitting has a confusion of 180° (e.g., 30° and 210°), a quadrant into which the major axis angle of the first arrival elliptical locus of the P wave obtained after the optimal fitting falls needs to be determined according to a positive/negative polarity of a maximum value of absolute values in the X-column data and a positive/negative polarity of a maximum value of absolute values in the Y-column data. For example, if the maximum value of absolute values in the X-column data is of positive polarity and the maximum value of absolute values in the Y-column data is of negative polarity, the major axis angle falls into the second quadrant.

(2) A major axis orientation of the first arrival elliptical locus of the P wave obtained after the optimal fitting is determined according to the quadrant into which the major axis angle falls.

(3) The major axis orientation of the first arrival elliptical locus of the P wave obtained after the optimal fitting is converted into a geographic azimuth, and the geographic azimuth is determined as the azimuth of the marsquake/moonquake relative to the single seismic station.

For example, $\theta_g = 90° - \theta$, where $\theta_g$ represents the geographic azimuth; $\theta$ represents the major axis orientation; and if $\theta_g < 0$, $\theta_g = \theta_g + 360$.

Further, a quadrant into which a minor axis angle of the first arrival elliptical locus of the P wave obtained after the optimal fitting falls and a minor axis orientation are similarly determined according to the positive/negative polarity of the maximum value of the absolute values in the X-column data and the positive/negative polarity of the maximum value of the absolute values in the Y-column data.

Further, before determining the quadrant into which the major axis angle of the first arrival elliptical locus of the P wave obtained after the optimal fitting falls according to the positive/negative polarity of the maximum value of the absolute values in the X-column data and the positive/negative polarity of the maximum value of the absolute values in the Y-column data, the method also includes the following steps.

The absolute value of each piece of data in the X-column data, and the maximum value is selected from the absolute values of all the data. The positive/negative polarity corresponding to the maximum value is then determined as the positive/negative polarity of the maximum value of the absolute values in the X-column data.

Similarly, the absolute value of each piece of data in the Y-column data, and the maximum value is selected from the absolute values of all the data. The positive/negative polarity corresponding to the maximum value is then determined as the positive/negative polarity of the maximum value of the absolute values in the Y-column data.

FIG. 2 is an oscillogram of a marsquake, showing an E component, an N component, and a Z component in sequence from top to bottom. In FIG. 2, the dotted line represents the arrival time of the P wave; the horizontal axis is the relative time to the arrival time of the P wave in units of second, and the vertical axis is the amplitude of the waveform.

Figure 3:
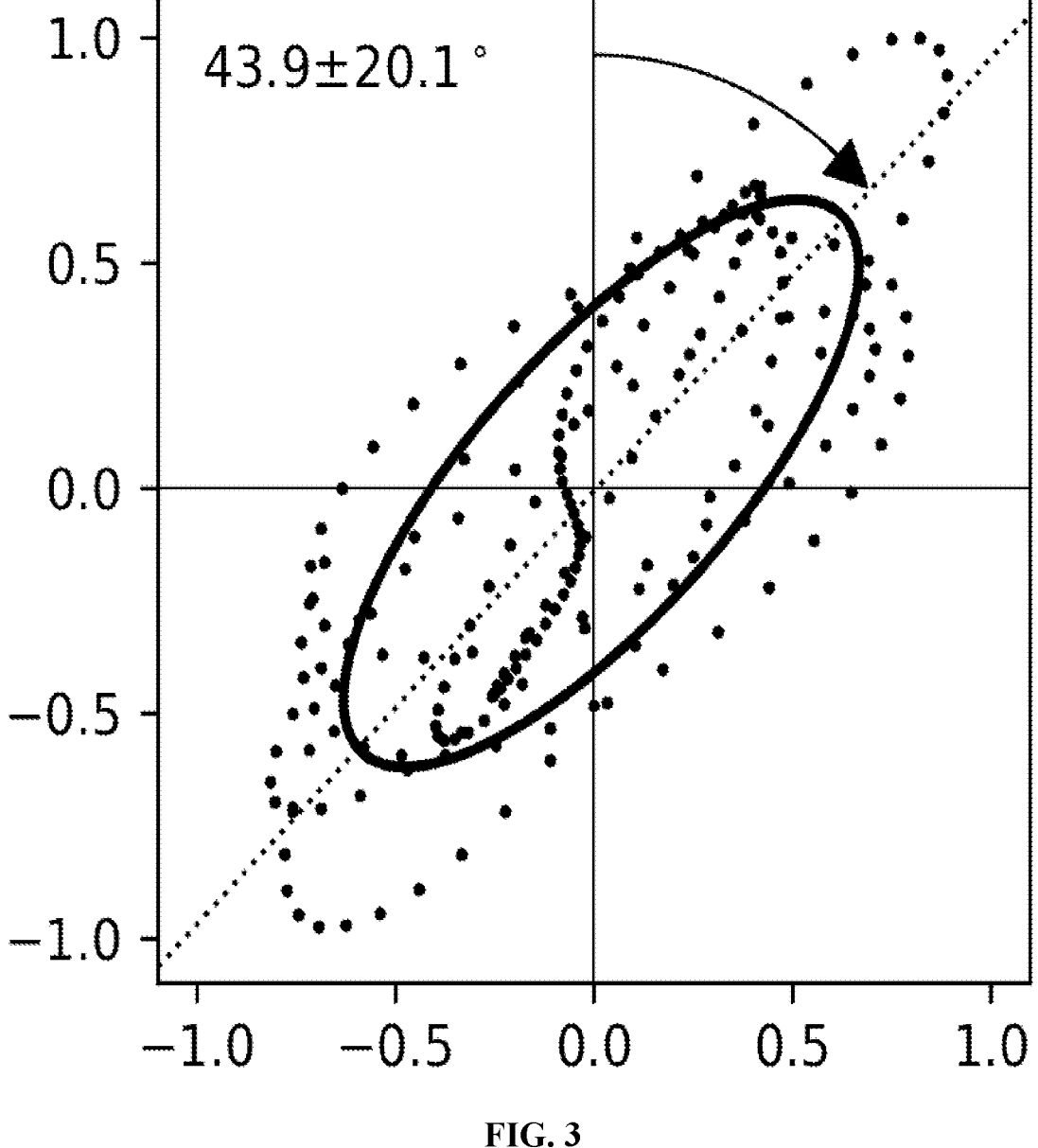
FIG. 3 is a diagram of a first arrival elliptical locus of a P wave obtained after optimal fitting by fitting waveform data of a marsquake using a direct least square ellipse fitting algorithm provided in an embodiment of the present disclosure.

FIG. 3 is a diagram of a first arrival elliptical locus of a P wave obtained after optimal fitting by fitting waveform data of a marsquake using a direct least square ellipse fitting algorithm, in which scattered points represent the first arrival motion locus of the P wave; the thick line represents the ellipse obtained after the optimal fitting; the dotted line represents the major axis of the ellipse; the solid arrow indicates the calculated azimuth of the marsquake relative to the single seismic station; the calculated azimuth and the error are marked at the upper left corner; and the error of the azimuth is defined as: $\tan^{-1}(\text{minor axis/major axis}) \cdot 180/\pi$.

Example 2

To perform the corresponding method of Example 1 so as to implement corresponding functions and technical effects, a system for determining an azimuth of a marsquake/moonquake event is provided to include a plurality of seismometers in a single seismic station and a computer.

Figure 4:
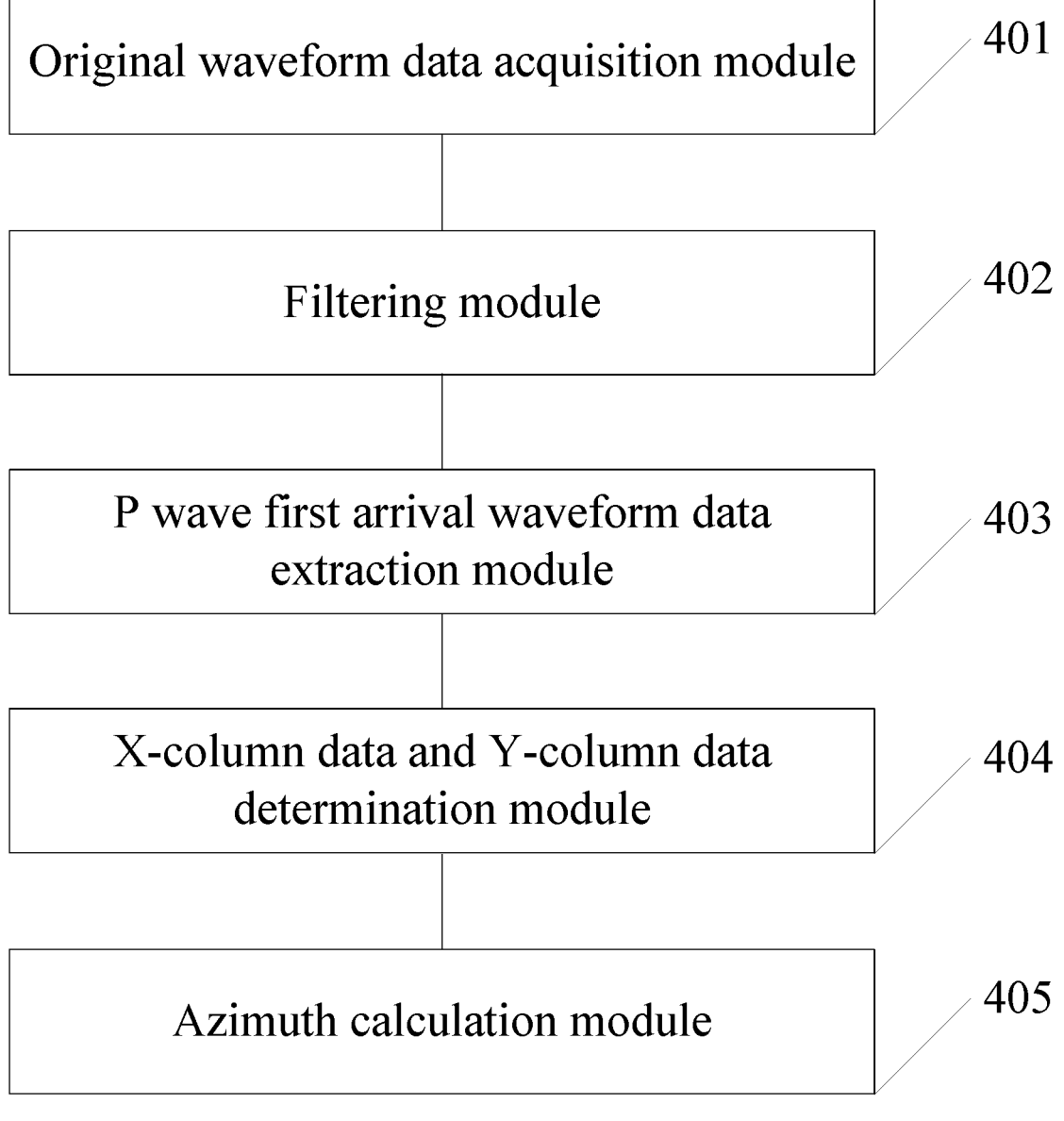
FIG. 4 is a structural schematic diagram of a system for determining an azimuth of a marsquake/moonquake event provided in an embodiment of the present disclosure.

As shown in FIG. 4, an example computer of the system includes an original waveform data acquisition module 401, a filtering module 402, a P wave first arrival waveform data extraction module 403, an X-column data and Y-column data determination module 404, and an azimuth calculation module 405, where the original waveform data acquisition module 401 is configured to acquire original waveform data from a plurality of seismometers in a single seismic station, where when the single seismic station is situated on Mars, the original waveform data collected by the single seismic station is original waveform data of a marsquake; and when the single seismic station is situated on the moon, the original waveform data collected by the single seismic station is original waveform data of a moonquake;

the filtering module 402 is configured to filter the original waveform data to obtain filtered waveform data;

the P wave first arrival waveform data extraction module 403 is configured to intercept filtered waveform data of a set time length to obtain first arrival waveform data of a P wave, where a starting time of the set time length is an arrival time of the P wave;

the X-column data and Y-column data determination module 404 is configured to perform data analysis on the first arrival waveform data of the P wave, and determine the first arrival waveform data of the P wave of an E component obtained after the data analysis as X-column data and the first arrival waveform data of the P wave of an N component obtained after the data analysis as Y-column data; and the azimuth calculation module 405 is configured to perform optimal fitting on the X-column data and the Y-column data using a direct least square ellipse fitting algorithm to obtain a first arrival elliptical locus of the P wave obtained after the optimal fitting, and determine an azimuth of the marsquake/moonquake relative to the single seismic station according to the first arrival elliptical locus of the P wave obtained after the optimal fitting.

Further, the filtering module 402 specifically includes:

a ZNE coordinate system data determination unit configured to rotate the original waveform data to a ZNE orthogonal coordinate system to obtain ZNE coordinate system data; and a filtering unit configured to filter the ZNE coordinate system data using a filter to obtain filtered waveform data.

For determining an azimuth of the marsquake/moonquake relative to the single seismic station according to the first arrival elliptical locus of the P wave obtained after the optimal fitting, the azimuth calculation module 405 is configured to:

determine a quadrant into which a major axis angle of the first arrival elliptical locus of the P wave obtained after the optimal fitting falls according to a positive/negative polarity of a maximum value of absolute values in the X-column data and a positive/negative polarity of a maximum value of absolute values in the Y-column data;

determine a major axis orientation of the first arrival elliptical locus of the P wave obtained after the optimal fitting according to the quadrant into which the major axis angle falls; and convert the major axis orientation of the first arrival elliptical locus of the P wave obtained after the optimal fitting into a geographic azimuth, and determine the geographic azimuth as the azimuth of the marsquake/moonquake relative to the single seismic station.

The embodiments are described herein in a progressive manner. Each embodiment focuses on the difference from another embodiment, and the same and similar parts between the embodiments may refer to each other. Since the system disclosed in an embodiment corresponds to the method disclosed in an embodiment, the description is relatively simple, and for related contents, references can be made to the description of the method.

As one skilled in the art would understand, the computer, modules, units, seismometers, seismic stations, transceivers, as well an any other controller, machine, apparatus, element, sensor, device, component, system, subsystem, arrangement, or the like described or noted herein may individually, collectively, or in any combination comprise appropriate circuitry, such as one or more appropriately programmed processors (e.g., one or more microprocessors including central processing units (CPU)) and associated memory, which may include stored operating system software and/or application software executable by the processor(s) for controlling operation thereof and/or for performing the particular algorithms represented by the various functions and/or operations described herein, including interaction and/or cooperation between any such computer, module, unit, seismometer, seismic station, transceiver, controller, machine, apparatus, element, sensor, device, component, system, subsystem, arrangement, or the like. One or more of such processors, as well as other circuitry and/or hardware, may be included in a single component, or several processors and various circuitry and/or hardware may be distributed, including remotely, among several separate components, whether individually packaged or assembled together.

Specific examples are used herein to explain the principles and embodiments of the present disclosure. The foregoing description of the embodiments is merely intended to help understand the method of the present disclosure and its core ideas; besides, various modifications may be made by a person of ordinary skill in the art to specific embodiments and the scope of application in accordance with the ideas of the present disclosure. In conclusion, the contents of the present description shall not be construed as limitations to the present disclosure.

What is claimed is:

1. A method for determining an azimuth of a marsquake or moonquake event, comprising:

collecting original waveform data of a marsquake or moonquake by a plurality of seismometers in a single seismic station, wherein when the single seismic station is situated on Mars, the original waveform data collected by the plurality of the seismometers in the single seismic station is original waveform data of a marsquake; and when the single seismic station is situated on Moon, the original waveform data collected by the plurality of the seismometers in the single seismic station is original waveform data of a moonquake;

acquiring, by a computer, the original waveform data of the marsquake or moonquake from the plurality of the seismometers in the single seismic station;

filtering, by the computer, the original waveform data to obtain filtered waveform data;

intercepting, by the computer, filtered waveform data of a set time length to obtain first arrival waveform data of a P wave, wherein a starting time of the set time length is an arrival time of the P wave;

performing, by the computer, data analysis on the first arrival waveform data of the P wave, and determining the first arrival waveform data of the P wave of an east (E) component obtained after the data analysis as X-column data and the first arrival waveform data of the P wave of a north (N) component obtained after the data analysis as Y-column data; and performing, by the computer, optimal fitting on the X-column data and the Y-column data using a direct least square ellipse fitting algorithm to obtain a first arrival elliptical locus of the P wave obtained after the optimal fitting, and determining an azimuth of the marsquake or moonquake relative to the single seismic station according to the first arrival elliptical locus of the P wave obtained after the optimal fitting.

2. The method for determining an azimuth of a marsquake or moonquake event according to claim 1, wherein the filtering the original waveform data to obtain filtered waveform data specifically comprises:

rotating the original waveform data to a ZNE orthogonal coordinate system to obtain ZNE coordinate system data; and filtering the ZNE coordinate system data using a filter to obtain the filtered waveform data.

3. The method for determining an azimuth of a marsquake or moonquake event according to claim 1, wherein the determining an azimuth of the marsquake or moonquake relative to the single seismic station according to the first arrival elliptical locus of the P wave obtained after the optimal fitting specifically comprises:

determining a quadrant into which a major axis angle of the first arrival elliptical locus of the P wave obtained after the optimal fitting falls according to a positive or negative polarity of a maximum value of absolute values in the X-column data and a positive or negative polarity of a maximum value of absolute values in the Y-column data;

determining a major axis orientation of the first arrival elliptical locus of the P wave obtained after the optimal fitting according to the quadrant into which the major axis angle falls; and converting the major axis orientation of the first arrival elliptical locus of the P wave obtained after the optimal fitting into a geographic azimuth, and determining the geographic azimuth as the azimuth of the marsquake or moonquake relative to the single seismic station.

4. A system for determining an azimuth of a marsquake or moonquake event, comprising: a plurality of seismometers in a single seismic station and a computer, wherein the plurality of the seismometers are configured to collect original waveform data of a marsquake or moonquake; when the single seismic station is situated on Mars, the original waveform data collected by the plurality of the seismometers in the single seismic station is original waveform data of a marsquake; and when the single seismic station is situated on Moon, the original waveform data collected by the plurality of the seismometers in the single seismic station is original waveform data of a moonquake the computer is configured to acquire the original waveform data of the marsquake or moonquake from the plurality of the seismometers for executing operations comprising:

filtering the original waveform data to obtain filtered waveform data;

intercepting filtered waveform data of a set time length to obtain first arrival waveform data of a P wave, wherein a starting time of the set time length is an arrival time of the P wave;

performing data analysis on the first arrival waveform data of the P wave, and determining the first arrival waveform data of the P wave of an E component obtained after the data analysis as X-column data and the first arrival waveform data of the P wave of an N component obtained after the data analysis as Y-column data; and performing optimal fitting on the X-column data and the Y-column data using a direct least square ellipse fitting algorithm to obtain a first arrival elliptical locus of the P wave obtained after the optimal fitting, and determining an azimuth of the marsquake or moonquake relative to the single seismic station according to the first arrival elliptical locus of the P wave obtained after the optimal fitting.

5. The system for determining an azimuth of a marsquake or moonquake event according to claim 4, wherein the filtering the original waveform data to obtain filtered waveform data specifically comprises:

rotating the original waveform data to a ZNE orthogonal coordinate system to obtain ZNE coordinate system data; and filtering the ZNE coordinate system data using a filter to obtain filtered waveform data.

6. The system for determining an azimuth of a marsquake or moonquake event according to claim 4, wherein for determining an azimuth of the marsquake or moonquake relative to the single seismic station according to the first arrival elliptical locus of the P wave obtained after the optimal fitting comprises:

determining a quadrant into which a major axis angle of the first arrival elliptical locus of the P wave obtained after the optimal fitting falls according to a positive or negative polarity of a maximum value of absolute values in the X-column data and a positive or negative polarity of a maximum value of absolute values in the Y-column data;

determining a major axis orientation of the first arrival elliptical locus of the P wave obtained after the optimal fitting according to the quadrant into which the major axis angle falls; and converting the major axis orientation of the first arrival elliptical locus of the P wave obtained after the optimal fitting into a geographic azimuth, and determine the geographic azimuth as the azimuth of the marsquake or moonquake relative to the single seismic station.

* * * * *